Patented Jan. 10, 1933

1,893,939

UNITED STATES PATENT OFFICE

MORRIS GROSSMAN, OF NEW YORK, N. Y.

PROCESS OF MANUFACTURING METALLIC COATED PRODUCTS

No Drawing.  Application filed July 8, 1929. Serial No. 376,855.

The object of my invention is to provide a novel process of manufacturing metallic or other coated products and especially a process for the manufacture of a product having either a paper or fabric base and coated with a layer of metal or a layer of celluloid or cellophane. To illustrate, if I use a fabric material as my base, such as muslin or broadcloth, and treat this fabric with my adhesive solution, and then apply a layer of aluminum foil, the resultant product will be flexible, durable, airtight, waterproof and fireproof. In addition, the finished product can be embossed with designs such as birds, animals, reptiles, to represent leather, and can be obtained in a variety of colors. If I use tin or lead foil, the same result can be had with the exception that the finished product will not be fireproof.

A muslin fabric and my adhesive, plus a layer of aluminum foil results in an excellent fabric which can be used for upholstery, electrical condensers, handbags, suitcases, shoes, slippers, book-binding, and as an aeroplane cloth for wings, etc.

By employing a manila paper base, treating the paper with the adhesive solution, and then applying the metal foil, preferably aluminum, many interesting applications may be made of this product such as boxes, non-inflammable ash trays, plates, table covers, etc.

If desired, the paper or muslin base can be treated with the adhesive and then coated with cellophane or celluloid. If further desired, muslin or broadcloth can be treated with the adhesive and then the metallic foil applied, thereupon a second layer of muslin or broadcloth is applied. This yields a product which makes an excellent insulated conductor of electricity good for condensers and cables, and which is particularly suitable for use in tents, awnings, etc., because of its waterproofing qualities. A similar combination of materials, but replacing the metal foil by celluloid, will result in a fabric which can be employed in constructing bullet proof vests, pads or other articles.

In carrying out my process I take one pound of pure para gum (india rubber), the gum must be of the finest grade and free of all impurities. This gum is heated in a kettle to 302° F. (150° C.). When the gum is heated to this degree of heat, I now add one pound of mineral oil. The mixture of oil and gum is thoroughly stirred and allowed to boil for one-half hour at the afore-mentioned temperature, whereupon the oil dissolves the rubber. The result of this reaction is an adhesive solution which is remarkable for its adhesive properties.

Next, I take the material to be treated for example broadcloth and place it upon a roller and apply the adhesive solution to the broadcloth while it is still warm. The solution of adhesive penetrates the fibres of the cloth and deposits thereon a fine layer of adhesive. The cloth with this fine adhesive coating is allowed to cool. The next step, after the adhesive coating upon the cloth has cooled, is to apply to the adhesive surface coating of the cloth, a layer of aluminum foil of .005 in thickness. If desired, the metal can be first cleaned with an alcoholic solution of hydrochloric acid. The foil adheres readily to the adhesive surface of the cloth, whereupon the combined fabric and foil are put thru rollers, to eliminate any air bubbles and surplus adhesive. The product is now finished ready for embossing if so desired.

It will be noted that the adhesive described herein, is the only adhesive which will cause an aluminum foil to adhere to paper or fabric so that the metallic surface cannot possibly be separated from the base without destruction of the base. Furthermore, this is important, if any of the ordinary glues or adhesives were to be used in a combination such as I propose, the ordinary adhesive would act as a sizing, so that the base or cloth would become stiff and hard, thereby making the product absolutely unfit for the many uses which I propose for my invention.

While I have described my process as adaptable to paper or fabric, I do not limit the process to the materials mentioned, for it can be readily seen that the same result can be obtained from any weight or stock of paper and any kind of fabric, be it muslin, broadcloth, silk, felt, cotton, etc., and in comgrees F. for about one half hour, allowing the solution to cool on the fabric and applying thereto a layer of metallic foil.

What I claim is:

1. A process of manufacturing a product having a fabric base, consisting in applying while it is still warm an adhesive solution composed of india rubber and mineral oil which have previously been boiled together at a temperature of approximately 302 degrees F. for about one half hour, allowing the solution to cool on the fabric and applying thereto a layer of aluminum foil of approximately .005 in thickness.

2. A process of manufacturing a product having a fabric base, consisting in applying while it is still warm an adhesive solution composed of india rubber and mineral oil which have previously been boiled together at a temperature of approximately 302 degrees F. for about one half hour, allowing the solution to cool on the fabric and applying thereto a layer of metallic foil.

MORRIS GROSSMAN.